Patented Dec. 29, 1942

2,306,919

UNITED STATES PATENT OFFICE

2,306,919

SECONDARY AMINE REACTION PRODUCT

John M. Weiss and Robert P. Weiss, New York, N. Y., assignors to Research Corporation, a corporation of New York No Drawing. Application February 15, 1940, Serial No. 319,029

9 Claims. (Cl. 260—78)

This invention relates to the production of resinous reaction products of maleic anhydride compounds with amine compounds and it includes these reaction products themselves as new compounds and compositions of matter.

The invention arose through the discovery that maleic anhydride and certain derivatives thereof, such as chlormaleic anhydride, will react with various amines to form products, many of which are of a resinous character and adapted to be employed as molding and casting resins, in the manufacture of resinous base varnishes, paints and lacquers, in rubber compounding, and in other uses where various types of resins and plastics are customarily employed.

In its broader aspects, the present invention is concerned with a process in which aliphatic dibasic acid anhydrides (or the acids themselves) wherein the carboxyl groups are attached to adjacent carbon atoms joined by a double bond, are reacted with amines to form products which either themselves are resinous in nature or from which resinous bodies can be obtained. The term "amine" as used throughout this specification and the appended claims refers only to those nitrogen-containing compounds in which the nitrogen atom is trivalent, and is connected to one, two or three carbon atoms, and to two or one hydrogen atoms when it is attached to only one or two carbon atoms. Such substances as those of the hydrazine class, wherein nitrogen-to-nitrogen linkages occur, are not amines and are not within the class of substances with which this invention is concerned. A "secondary amine," as the term is employed in this specification and appended claims, indicates an amine in which a nitrogen atom is attached to two different carbon atoms.

Other substances capable of entering into this characteristic reaction to produce commercially valuable products will hereinafter be disclosed. The present reaction is not to be confused with those which may involve reaction of other substituent groups contained in the amine compound used.

The broad object of the invention is to provide a new group of resins and resin-like bodies having a wide variety of physical and chemical properties. A specific object is to produce for commercial purposes a series of water-insoluble resins and another series of valuable water-soluble resins.

In the well known Diels and Alder reaction (see, for example, United States Patent No. 1,944,731) maleic anhydride is reacted with organic compounds having a characteristic system of conjugated double bonds. It is well known that conjugated double bonds, i. e., the grouping —C=C—C=C—, are quite reactive, both in aliphatic compounds and in hydroaromatic compounds. However, compounds which contain such groupings as

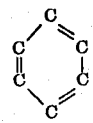

in which there is a ring with three double bonds alternate with three single bonds, as in aromatic and certain heterocyclic compounds, the reactions characteristic of conjugated double bonds that occur in the patented process do not take place, and hence this grouping is not considered reactive in the sense employed in the patent and in the present specification. We have discovered that maleic anhydride, or its equivalent, will react with other organic compounds which may not contain conjugated double bonds, such compounds being those containing an amine group. The present reaction therefore is independent of any double bonds in the reacting amine. It is also known that maleic acid and its anhydride, in common with other dibasic or polybasic acids and anhydrides, such as succinic and phthalic acids and anhydrides, may be reacted with triethanolamine and other amines having a plurality of alkylol groups to form resins. In these cases, however, the reaction takes place between the acids and the multiple hydroxyl groups of the amine to form alkyd-type resins, and these products are not related to the products with which this invention deals, nor is their formation within the purview of the present invention.

In the practice of the invention a reaction occurs and resins may be formed starting with the maleic anhydride compound and primary, secondary or tertiary amines. It appears that the nature of the reaction by which resinous products are produced varies somewhat as between the amines of these three general classes. Thus, in the case of primary amines, it is probable that reaction with maleic anhydride produces a maleamic acid which may be further converted into a maleimide, and the resinous products appear to be formed from primary amines by the condensation or polymerization of the maleamic acid or the maleimide. In the case of secondary amines, maleamic acid derivatives are formed, and it appears that the resinous products are obtained by condensation or polymerization of the resulting maleamic acid. In the case of tertiary amines a somewhat different action seems to be involved in which these amines induce the resinification of the maleic anhydride compound, and this occurs even when catalytic quantities of the tertiary amine are used, as well as when larger amounts are employed. The present application is directed specifically to those embodiments of the invention in which secondary amines are employed. Those embodiments of the invention which are concerned with primary and tertiary amines are the specific objects of copending applications Serial No. 319,028, filed Feb. 15, 1940, and Serial No. 319,030, filed Feb. 15, 1940, respectively.

The reactions herein described are in some cases strongly exothermic. Under such conditions the reaction can usually be controlled by cooling or by the presence of suitable diluents during the reaction. In some cases, however, it may be necessary to heat the reaction materials to high temperatures, or to heat them under pressure. In some instances products such as maleic acid, fumaric acid, malic acid, ethyl fumarate, and the like (that is, substances which appear to liberate maleic anhydride during reaction), may be used instead of maleic anhydride in the practice of the invention. When these substances are used in place of maleic anhydride or its simple derivatives, such as chlormaleic anhydride, heat is usually necessary to start the reaction.

The reaction products may be modified in various ways. For example, the reaction may be conducted in the presence of glycerine, glycol, or another polyhydric alcohol with or without a modifying acid of a type other than the maleic anhydride compound. Complex resinous masses or mixtures of resins including the products of this invention and alkyd-type materials may be thus obtained. Also, mixtures of amines may be used rather than individual amine compounds to vary the properties of the products, or to take advantage of the varying rates of reaction with maleic anhydride compounds possessed by the various amines.

While the exact nature of the reaction in some instances has not been determined, we have found that in certain cases clearly defined reactions appear to take place. In these reactions water vapor, volatile intermediate products, or carbon dioxide may be evolved. The difference in properties obtained by heating the same ingredients at different temperatures also shows that an initial reaction may take place forming products which may or may not have resinous properties, and which products thereafter condense or polymerize to form resinous masses. All intermediate resinous or resin-forming products as well as final products are part of this invention.

As has been indicated, in the reaction of maleic anhydride with a secondary amine, in which the organic radicals may be aromatic, aliphatic or aralky groups or a heterocyclic group, it appears that there is formed an N-substituted maleamic acid. In these reactions employing secondary amines, the resinous products appear to be the result of the condensation or polymerization of the N-substituted maleamic acids. The reaction may be illustrated by the following scheme:

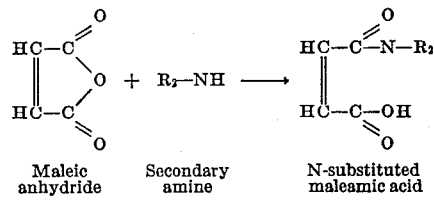

| Maleic anhydride | Secondary amine | N-substituted maleamic acid |

Various proportions of the reacting materials may be used in the practice of the invention. As in the case of primary amines, the reaction may occur in molecular proportions of the maleic anhydride compound and the secondary amine or in multiples of these proportions, according to the number of amino groups in the amine compound, but it is not necessary to employ these proportions, and greater or lesser amounts may be used. It is therefore to be understood that the present invention is not limited to any particular reacting proportions of the ingredients.

The invention will be illustrated by the following examples which are typical of its scope but which are not intended in any way to indicate its limits.

*Example I*

One mol of di-n-butylamine was added gradually to one mol of molten maleic anhydride. A reaction occurred which caused a rise in temperature, and a liquid product was formed. This product became more viscous on continued heating, but it was not solid, when cooled, even after a final heating period of 4 hours at 250° C.

The dark, viscous reaction product apparently was a polymer of the N-dibutyl maleamic acid. It was not soluble in hexane nor in water.

*Example II*

One mol of morpholine was reacted with one mol of molten maleic anhydride. This reaction proceeded with the evolution of heat. After a final heating period of 2 hours at 200° C., a product was obtained which was soluble in acetone but insoluble in water.

In addition to the reactions described above, resins have been formed from maleic anhydride and other secondary amines and amino compounds. For example, using diamyl amine, a brownish liquid mass was obtained which was soluble in alcohol but insoluble in water. On baking, this material became a resinous solid. From diethyl amine, a soft, tarry resin resulted which was soluble in water, benzene and alcohol. Using diethyl amine and maleic acid, a thick liquid product first resulted, and this, on continued heating, gave rise to a product similar to that obtained from maleic anhydride. Resinous products have also been made from maleic anhydride by reaction with dimethyl amine (gas). Resins also may be made from maleic anhydride in reaction with various other secondary polyamines.

It will be apparent that the invention is not limited to any particular procedure for introducing the ingredients into the reaction or for conducting the reaction itself. Acid imides and amino compounds containing carboxyl or sulfonic acid groups react with difficulty, if at all, with maleic anhydride, but where capable of reaction such compounds may be used in the practice of the invention.

Preferred aliphatic dibasic acid compounds for use in the invention include maleic anhydride itself, and those products above specified which appear to liberate maleic anhydride in the course of the reaction, as well as halogen derivatives of such compounds. Since this invention provides an entirely new series of resins and resinous materials, it will be obvious that these may be modified in the usual way by admixing them with other artificial resins, or natural resins and gums, and with such materials as cellulose esters, ethers or related derivatives, and that pigments, filler materials, plasticizers, waxes and the like, may be included in compositions containing the new resins which are employed to form protective coatings, sheet products or molded objects. Other modifications of the resins and resin-forming reactions disclosed will be apparent, and these variations are included within our invention as defined by the appended claims.

This application contains subject matter in common with and is, in part, a continuation of our copending applications Serial No. 737,204, filed July 27, 1934; Serial No. 132,710, filed March 24, 1937; and Serial No. 132,737, filed March 24, 1937.

We claim:

1. Process for making an artificial resinous body which comprises reacting an anhydride of a polybasic aliphatic acid compound having two carboxyl groups attached to adjacent carbon atoms joined by an olefinic double bond with essentially only a secondary aliphatic amine, condensing from part to all the carboxyl groups of said polybasic acid compound substantially only with amino groups, and further condensing or polymerizing the product thus obtained with itself to form a resinous body.

2. Process for making an artificial resinous body which comprises heating compounds capable of yielding maleic anhydride under the conditions of the process with essentially only a secondary aliphatic amine, condensing from part to all the carboxyl groups of the maleic anhydride thus yielded substantially only with amino groups, and further condensing or polymerizing the product thus obtained with itself to form a resinous body.

3. Process for making an artificial resinous body which comprises reacting an anhydride of a polybasic aliphatic acid compound having two carboxyl groups attached to adjacent carbon atoms joined by an olefinic double bond with essentially only a secondary aliphatic polyamine, condensing from part to all the carboxyl groups of said polybasic acid compound substantially only with amino groups, and further condensing or polymerizing the product thus obtained with itself to form a resinous body.

4. Process for making an artificial resinous body which comprises reacting maleic anhydride with essentially only a secondary aliphatic monoamine, condensing from part to all the carboxyl groups of said maleic anhydride substantially only with amine groups, and further condensing or polymerizing the product thus obtained with itself to form a resinous body.

5. Process for making an artificial resinous body which comprises reacting maleic anhydride with essentially only a secondary butylamine, condensing from part to all the carboxyl groups of said maleic anhydride substantially only with amino groups, and further condensing or polymerizing the product thus obtained with itself to form a resinous body.

6. An artificial resinous body resulting from the condensation or polymerization with itself of a product obtained by the reaction of essentially only a secondary aliphatic amine with an anhydride of a polybasic aliphatic acid compound having two carboxyl groups attached to adjacent carbon atoms joined by an olefinic double bond, from part to all the carboxyl groups of said polybasic acid compound being condensed substantially only with amino groups in forming said product.

7. An artificial resinous body resulting from the condensation or polymerization with itself of a product obtained by the reaction of essentially only a secondary aliphatic polyamine with an anhydride of a polybasic aliphatic acid compound having two carboxyl groups attached to adjacent carbon atoms joined by an olefinic double bond, from part to all the carboxyl groups of said polybasic acid compound being condensed substantially only with amino groups in forming said product.

8. An artificial resinous body resulting from the condensation or polymerization with itself of a product obtained by the reaction of essentially only a secondary aliphatic amine and maleic anhydride, from part to all the carboxyl groups of the maleic anhydride being condensed only with amino groups in forming said product.

9. An artificial resinous body resulting from the condensation or polymerization with itself of a product obtained by the reaction of essentially only a secondary butylamine and maleic anhydride, from part to all the carboxyl groups of the maleic anhydride being condensed only with amino groups in forming said product.

JOHN M. WEISS.
ROBERT P. WEISS.